United States Patent
Mammadov et al.

(10) Patent No.: US 10,005,673 B2
(45) Date of Patent: Jun. 26, 2018

(54) PURIFICATION OF CARBON DIOXIDE STREAMS

(71) Applicant: SAUDI BASIC INDUSTRIES CORPORATION, Riyadh (SA)

(72) Inventors: Aghaddin Kh. Mammadov, Houston, TX (US); Shahid N. Shaikh, Houston, TX (US); Clark David Rea, Houston, TX (US); Xiankuan Zhang, Houston, TX (US)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 0 days. days.

(21) Appl. No.: 15/028,976

(22) PCT Filed: Oct. 15, 2014

(86) PCT No.: PCT/US2014/060554
§ 371 (c)(1),
(2) Date: Apr. 13, 2016

(87) PCT Pub. No.: WO2015/057752
PCT Pub. Date: Apr. 23, 2015

(65) Prior Publication Data
US 2016/0251226 A1 Sep. 1, 2016

Related U.S. Application Data

(60) Provisional application No. 61/891,448, filed on Oct. 16, 2013.

(51) Int. Cl.
*C01B 31/20* (2006.01)
*B01D 53/86* (2006.01)
(Continued)

(52) U.S. Cl.
CPC .......... *C01B 31/20* (2013.01); *B01D 53/8687* (2013.01); *B01J 23/002* (2013.01);
(Continued)

(58) Field of Classification Search
CPC ........ B01D 53/8687; B01D 2255/2063; B01D 2255/2065; B01D 2255/20723;
(Continued)

(56) References Cited

U.S. PATENT DOCUMENTS 3,989,807 A  11/1976  Johnston
4,330,513 A  5/1982   Hunter et al.
(Continued)

FOREIGN PATENT DOCUMENTS

CN  101069848 A  11/2007
CN  101185796 A  5/2008
(Continued)

OTHER PUBLICATIONS

Kießling, et al., Perovskite-type oxides—catalyst for the total oxidation of chlorinated hydrocarbons, Applied Catalysis B: Environmental 1998; 19: 143-151.*
(Continued)

*Primary Examiner* — Daniel C McCracken
(74) *Attorney, Agent, or Firm* — Cantor Colburn LLP

(57) ABSTRACT

In one embodiment, a process for the purification of $CO_2$ from chlorinated and non-chlorinated hydrocarbons, comprising: contacting a $CO_2$ stream with a metal oxide catalyst, wherein the stream comprises the $CO_2$ and impurities comprising the non-chlorinated hydrocarbons and the chlorinated hydrocarbons; interacting the impurities with the catalyst to form additional $CO_2$ and metal chloride; and regenerating the catalyst by contacting the metal chloride with an oxygen containing gas stream. In another embodiment, a process for the purification of $CO_2$ from chlorinated
(Continued)

hydrocarbons and non-chlorinated hydrocarbons, comprising: contacting a $CO_2$ stream with a metal oxide catalyst, wherein the $CO_2$ stream comprises the $CO_2$ and impurities comprising the non-chlorinated hydrocarbons and the chlorinated hydrocarbons; oxidizing the impurities with catalyst oxygen to form additional $CO_2$ and converting the chlorine to metal chloride; and regenerating the catalyst by contacting the metal chloride with an oxygen containing gas stream.

20 Claims, 2 Drawing Sheets

(51) Int. Cl.

| | |
|---|---|
| *B01J 38/12* | (2006.01) |
| *B01J 23/00* | (2006.01) |
| *B01J 23/34* | (2006.01) |
| *B01J 23/92* | (2006.01) |
| *C01B 32/50* | (2017.01) |
| *B01J 27/10* | (2006.01) |

(52) U.S. Cl.
CPC ............. *B01J 23/34* (2013.01); *B01J 23/92* (2013.01); *B01J 38/12* (2013.01); *C01B 32/50* (2017.08); *B01D 2255/2047* (2013.01); *B01D 2255/2063* (2013.01); *B01D 2255/2065* (2013.01); *B01D 2255/2073* (2013.01); *B01D 2255/2094* (2013.01); *B01D 2255/20723* (2013.01); *B01D 2255/20769* (2013.01); *B01D 2255/20776* (2013.01); *B01D 2255/40* (2013.01); *B01D 2256/22* (2013.01); *B01D 2257/206* (2013.01); *B01D 2257/702* (2013.01); *B01J 27/10* (2013.01); *Y02P 20/154* (2015.11); *Y02P 20/584* (2015.11)

(58) Field of Classification Search
CPC .. B01D 2255/2073; B01D 2255/20769; B01D 2255/20776; B01D 2255/2094; B01D 2255/40; B01D 2256/22; B01D 2257/206; B01D 2257/702; B01D 2255/2047; B01J 38/12; B01J 23/002; B01J 23/34; B01J 23/92; B01J 27/10; C01B 31/20; Y02P 20/154; Y02P 20/584
See application file for complete search history.

(56) References Cited

U.S. PATENT DOCUMENTS

| | | | |
|---|---|---|---|
| 4,488,890 | A | 12/1984 | Foerg et al. |
| 5,457,268 | A | 10/1995 | Greene et al. |
| 5,635,438 | A | 6/1997 | Cowfer et al. |
| 5,653,949 | A | 8/1997 | Chen et al. |
| 6,224,843 | B1* | 5/2001 | Ahmed ............... B01D 53/8662 423/240 R |
| 7,381,243 | B2 | 6/2008 | Alvarez, Jr. et al. |
| 2005/0069478 | A1* | 3/2005 | Weckhuysen ............ A62D 3/20 423/240 S |
| 2009/0324454 | A1 | 12/2009 | Nakano et al. |
| 2011/0011263 | A1* | 1/2011 | Hanke .................... B01D 53/68 95/233 |
| 2011/0044874 | A1 | 2/2011 | Dang et al. |

FOREIGN PATENT DOCUMENTS

| | | |
|---|---|---|
| CN | 101249378 A | 8/2008 |
| EP | 0182649 A2 | 5/1986 |
| EP | 182649 B1 | 5/1986 |
| EP | 1084744 A1 | 3/2001 |
| EP | 1291070 A1 | 3/2003 |
| EP | 2505264 A1 | 10/2012 |
| WO | 9412432 A1 | 6/1994 |
| WO | 03057318 A1 | 7/2003 |
| WO | 2010101073 A1 | 9/2010 |
| WO | 2012006729 A1 | 1/2012 |
| WO | 2015057754 A1 | 4/2015 |

OTHER PUBLICATIONS

Ferrandon; "Mixed Metal Oxide—Noble Metal Catalysts for Total Oxidation of Volatile Organic Compounds and Carbon Monoxide"; Dept. of Chem. Eng. & Tech.; Chem. Reaction Eng.; Royal Inst. of Tech.; 2001; 138 pages.
International Search Report for International Application No. PCT/US2014/060554; International Filing Date Oct. 15, 2014; dated Feb. 3, 2015; 6 pages.
Joon et al.; KR 2000042034 A; "Chromia/Zeolite Catalyst for Removing Chlorinated Volatile Organic Compounds and Method for Removing Them Using Same";Date fo Publication: Jul. 15, 2000; 1 Page, Abstract Only.
Miranda et al.; "Oxidation of trichloroethene over metal oxide catalysts: Kinetic studies and correlation with adsorption properties"; Chemosphere 66 (2007); pp. 1706-1715.
Paukshtis et al.; "Oxidative destruction of chlorinated hydrocarbons on Pt-containing fiber-glass catalysts"; Chemosphere; vol. 79; 2010; pp. 199-204.
Rusu et al.; "Destruction of Volatile Organic Compounds by Catalytic Oxidation": Environmental Engineering and Management Journal; Dec. 2003; vol. 2; No. 4; pp. 273-302.
Szargan et al.; EP0612689 (A1); "Process and Catalyst for Purifying Carbon Dioxide", EP Filing Date Feb. 7, 1994; Date of Publication: Aug. 31, 1994; 1 Page; Abstract Only.
Van Der Averit Ir et al.; "Low temperature destruction of chlorinated hydrocarbons over lanthanide oxide-based catalysts"; Fuel Chemistry Division Reprints 2002; 47(2); 2 pages.
Van Der Avert et al.; "Low-Temperature Destructin of Chlorinated Hydrocarbons over Lanthanide Oxide Based Catalysts"; Angew. Chem. Int. Ed. 2002, 41, No. 24; pp. 4730-4732.
Written Opinion of the International Search Report for International Application No. PCT/US2014/060554; International Filing Date Oct. 15, 2014; dated Feb. 3, 2015; 6 pages.

\* cited by examiner

PURIFICATION OF CARBON DIOXIDE STREAMS

CROSS REFERENCE TO RELATED APPLICATIONS

This application is a National Stage application of PCT/US2014/060554 filed Oct. 15, 2014, which claims the benefit of U.S. Provisional Application No. 61/891,448 filed Oct. 16, 2013, both of which are incorporated by reference in their entirety herein.

TECHNICAL FIELD

The present invention relates generally to the purification of carbon dioxide ($CO_2$), and more particularly to the purification of carbon dioxide ($CO_2$) off-gas streams such as those produced in ethylene glycol plants.

BACKGROUND $CO_2$ off-gas streams produced by ethylene glycol plants typically contain saturated and/or unsaturated chlorinated hydrocarbons. In order for the $CO_2$ off-gas to be used for the production of food grade products or for the production of methanol, urea, ethyl hexanol or certain other applications, organic chlorides and hydrocarbons must be removed or substantially removed from the $CO_2$ to meet acceptable industrial limits. For food-grade $CO_2$, for example, hydrocarbons should be removed to below 5 ppmv (parts per million by volume).

Prior technologies for purification of such $CO_2$ off-gas streams have included attempts such as oxidation of saturated and unsaturated hydrocarbons alone on precious metal catalysts, for example palladium (Pd) or platinum (Pt) catalysts. Prior techniques have also included conversion of hydrocarbons in the $CO_2$ off-gas to $CO_2$ and $H_2O$ followed by carbon dioxide vent to the atmosphere or further purification of a small stream of good grade $CO_2$ by adsorption on carbon.

Further techniques for the purification of $CO_2$ off-gas streams produced by ethylene glycol plants have included oxidation of saturated, unsaturated, and chlorinated hydrocarbons using a precious metal catalyst, for example platinum. Such methods have included the use of excess oxygen for the oxidation of the saturated, unsaturated, and chlorinated hydrocarbons. Such methods have also included condensation of pure saturated water, removal of hydrogen chloride (HCl) on an adsorbent, and subsequent final removal of oxygen ($O_2$) by reaction with hydrogen ($H_2$) in the presence of a catalyst. Thereafter, chloride, in the form of HCl, is separated by absorption.

There remains a need, however, for more efficient and improved systems for the purification of carbon dioxide ($CO_2$) off-gas streams such as those produced in ethylene glycol plants.

BRIEF DESCRIPTION

Disclosed herein are improved systems and methods for purification of $CO_2$ off-gas streams.

In one embodiment, a process for the purification of $CO_2$ from chlorinated hydrocarbons and non-chlorinated hydrocarbons, comprising: contacting a $CO_2$ stream with a metal oxide catalyst, wherein the stream comprises the $CO_2$ and impurities, wherein the impurities comprise the non-chlorinated hydrocarbons and the chlorinated hydrocarbons; interacting the impurities with the metal oxide catalyst to form additional $CO_2$ and metal chloride; and regenerating the metal oxide catalyst by contacting the metal chloride with an oxygen containing gas stream.

In one embodiment: a process for the purification of $CO_2$ from chlorinated hydrocarbons and non-chlorinated hydrocarbons, comprising: contacting a $CO_2$ stream with a metal oxide catalyst, wherein the $CO_2$ stream comprises the $CO_2$ and impurities, wherein the impurities comprise the non-chlorinated hydrocarbons and the chlorinated hydrocarbons; oxidizing the impurities with catalyst oxygen to form additional $CO_2$ and converting the chlorine to metal chloride; and regenerating the metal oxide catalyst by contacting the metal chloride with an oxygen containing gas stream; wherein no oxygen is added to the $CO_2$ stream before or during the contacting and the oxidation.

In one embodiment: a process for the purification of $CO_2$ from chlorinated hydrocarbons and non-chlorinated hydrocarbons, comprising: contacting a $CO_2$ stream with a metal oxide catalyst, wherein the $CO_2$ stream comprises the $CO_2$ and impurities, wherein the impurities comprise the non-chlorinated hydrocarbons and the chlorinated hydrocarbons; oxidizing the impurities with catalyst oxygen to form additional $CO_2$ and converting the chlorine to metal chloride; and regenerating the metal oxide catalyst by contacting the metal chloride with an oxygen containing gas stream; wherein the $CO_2$ stream comprises less than or equal to 0.3 ppmv of oxygen based on the total volume of the $CO_2$ stream.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Figure 1:
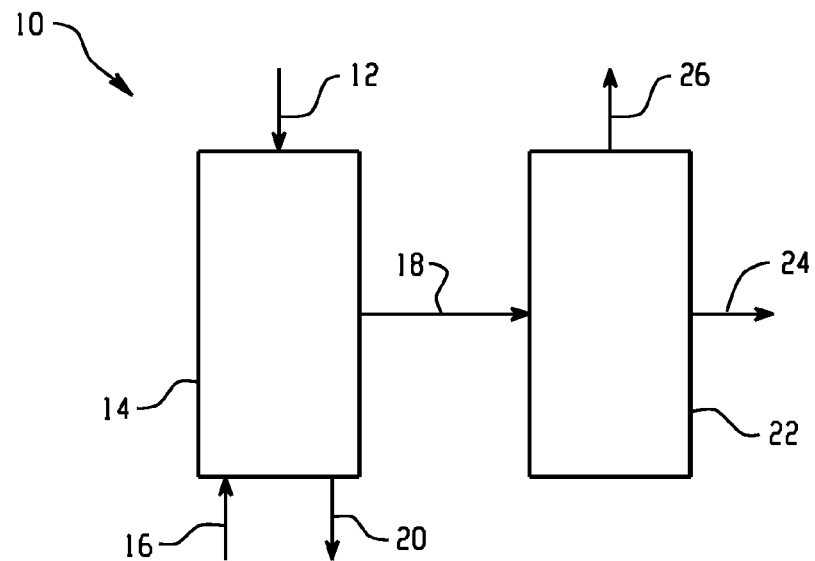
FIG. 1 illustrates a system and process for purification of a $CO_2$ off-gas stream.

Disclosed herein is a system and method for the purification of $CO_2$ off-gas streams containing impurities, where "impurities" refers to saturated hydrocarbons, and/or unsaturated hydrocarbons, and/or chlorinated hydrocarbons. Such $CO_2$ off-gas streams can be off-gas streams from ethylene glycol production plants. The method can allow for simultaneous oxidation of saturated, unsaturated, and/or chlorinated hydrocarbons, where the hydrocarbons can comprise 2 or more carbon atoms, preferably, 2 to 10 carbon atoms, more preferably, 2 to 4 carbon atoms. It is expected that purification of $CO_2$ in accordance with the method will be practical and efficient due to at least the use of a redox catalyst such that oxygen in the catalyst eliminates the need for an additional molecular oxygen feed to the reactor. The stoichiometric oxidation of the impurities by catalyst oxygen allows for purification of $CO_2$ due to the low ratio of the amount of impurities relative to the oxygen capacity of the catalyst, where the $CO_2$ off-gas can comprise 2 to 5 ppmv of impurities based on the total amount of $CO_2$ off-gas. For example, a typical composition of $CO_2$ off-gas from ethylene glycol plants is shown in Table 1.

TABLE 1*

| Composition | Amount |
| --- | --- |
| $O_2$ | 0.24 ppmv |
| Ar | (less than) 0.05 ppmv |
| $CH_4$ | 0.07 ppmv |
| $C_2H_4$ | 0.13 ppmv |
| $C_2H_6$ | (less than) 0.05 ppmv |
| $CO_2$ | 99.46 ppmv |
| EO (ethylene oxide) | (less than) 0.05 ppmv |
| $H_2O$ | Saturated at 93° C. |
| Methyl chloride | <0.1 ppmv |
| Vinyl chloride | <0.1 ppmv |
| Ethyl chloride | 2.5 ppmv |
| Allyl chloride | 0.1 ppmv |
| Ethylene dichloride | <0.1 ppmv |

*Units are volume percent on a dry basis

The system and method for the purification of $CO_2$ from streams containing organic chlorides can involve decomposition of organic chlorides in the presence of a redox catalyst such that organic substances are oxidized to $CO_2$, while chorine is adsorbed by the catalyst with formation of the corresponding metal chloride. In other words, the method allows for interaction of a $CO_2$ stream, containing chlorinated hydrocarbons and/or other traces of organic substances, with a redox catalyst (e.g., in the absence of oxygen feed) where oxidative conversion of the hydrocarbons and/or other organic substances transform to $CO_2$ and $H_2O$, while chlorine content of the hydrocarbons transforms to the metal chloride form of the metal in the redox element. Accordingly, the $CO_2$ feed can comprise less than or equal to 0.3 ppmv, preferably, less than or equal to 0.001 ppmv of oxygen based on the total volume of $CO_2$ feed and there can be no oxygen feed to the reactor or to a reaction zone during the purification. During regeneration of the catalyst, the metal chloride is oxidized back to the metal oxide form of the catalyst with formation of molecular $Cl_2$. The molecular chlorine in the resultant regeneration gas can be absorbed by water. The redox system can be used with oxides or a mixture of oxides performing redox cycles between metal chloride ($MeCl_n$), where n satisfies the valency and is, for example, an integer 2 to 6, and metal oxide ($MeO_x$) based on purification and regeneration phases. The method thus eliminates the need for a co-feed of oxygen with the $CO_2$ off-gas stream for the purification phase and further eliminates need for the subsequent removal of excess oxygen by, for example, reaction with hydrogen.

The process can thus include the use of a catalyst to substantially eliminate or eliminate impurities in $CO_2$ off-gas streams containing such impurities. For example, the impurities can be reduced to an amount of less than or equal to 0.01 ppmv, preferably, less than or equal to 0.001 ppmv based on the total amount of purified $CO_2$ off-gas. Such $CO_2$ off-gas streams often also include other components such as oxygen, argon, and/or water, where the oxygen in the $CO_2$ off-gas stream can be the only oxygen introduced to the catalyst during the purification reaction. Herein, oxygen for the process is provided by the catalyst, thereby eliminating the need for an additional molecular oxygen source during purification. This process thereby eliminates the need to remove excess oxygen from the purified $CO_2$, for example, in an oxidation step using hydrogen. The amount of $CO_2$ in the purified $CO_2$ stream can be greater than or equal to 99.9 vol %, preferably, greater than or equal to 99.99 vol % of $CO_2$ based on the total volume of the purified $CO_2$ stream.

More preferably, the impurities in the $CO_2$ off-gas streams to the reactor are oxidized into $CO_2$ and $H_2O$ using a redox catalyst, in the absence of an additional oxygen source or oxygen feed, such that oxidative conversion of the hydrocarbons and/or other organic substances are transformed to $CO_2$ and $H_2O$. Meanwhile, the chlorine content in the hydrocarbons transforms to the metal chloride form of the redox element of the catalyst. Oxygen in the catalyst can be regenerated such that the metal chloride form of the redox element transforms to the initial state of the oxide form of the catalyst and molecular $Cl_2$ in the presence of an oxygen source such as air. Accordingly, the method allows for the implementation of a redox system that uses oxide catalysts or a mixture of oxide catalysts that use a cycle alternating between MeOx and $MeCl_2$ and returning back to $MeO_x$ during regeneration, where Me represents the metal(s) in the catalyst.

The metal can comprise any metal that can alternate between MeOx and $MeCl_2$, preferably, the metal can comprise Mn, Sn, W, V, Mo, La, Ce, Pb, Mg, or a combination comprising one or more of the foregoing. The metal can include a first metal such as an element selected from the group of: Mn, Sn, W, V, and Mo and/or a second metal such as La, Ce, Pb, and Mg. The catalyst can comprise an inert support, such as a silica, $Al_2O_3$, MgO, or the like.

The catalyst can comprise 5 to 50 wt %, preferably, 15 to 25 wt % of metal oxide, based on the amount of metal oxide and support.

The catalyst can be a formed catalyst and can be prepared by methods such as pelletizing, tableting, or extruding the support and optionally the chromium into a shape such as a sphere, a tablet, a pellet, an extrudate, or the like. If the metal is not present during forming, then the metal can be impregnated onto the support. The formed catalyst can then be dried and/or calcined. The formed catalyst can be a sphere with an average diameter of, for example, 5 micrometers to 15 mm. The formed catalyst can be an extrudate with a diameter of, for example, 0.5 to 10 mm with a length of, for example, 1 to 15 mm.

The catalyst can exhibit mild basic properties so as to promote the formation of $CO_2$, because if the catalyst is too strong, carbonates can form. As used herein, "mild basic properties" refers to a catalyst used in oxidation reactions that favors the production of $CO_2$ rather than carbonates. For example, the basic property of various elements can be determined by redox potential, where elements having redox potential within −1.180 to 0.774 can be considered the mild basic.

The $CO_2$, purified by the present method, can be used in applications where high purity $CO_2$ is required, for example for methanol synthesis where the concentration of the chlorinated hydrocarbons should be less than 0.01 ppmv. This $CO_2$ can also be used for food grade applications.

Referring now to FIG. 1, a for purification of $CO_2$ off-gas streams such as that produced in an ethylene glycol plant is illustrated. As shown in FIG. 1, $CO_2$ off-gas feed stream 12 is fed to reactor 14. The $CO_2$ off-gas feed stream 12 can be fed to the reactor 14 without the addition of oxygen from another source. In other words, the $CO_2$ off-gas feed stream 12 can be added to the reactor as pure $CO_2$ off-gas feed and the reactor can be free of any additional oxygen stream added to the reactor 14 during the time when the $CO_2$ off-gas feed stream 12 is entering the reactor. The $CO_2$ feed stream can comprise less than or equal to 0.3, preferably, less than or equal to 0.001 ppmv of oxygen based on the total volume of $CO_2$ feed. The $CO_2$ off-gas feed stream 12 can have a composition similar to that shown in Table 1. Reactor 14 contains a redox catalyst suitable for the decomposition of the organic chlorides. Reactor 14 can be, for example, a fixed bed reactor, a fluidized bed reactor, and the like.

The temperature in reactor 14 can be 400 to 500 degrees Celsius (° C.), preferably, 440 to 460° C., during the purification stages of processing. During the purification of $CO_2$, $CO_2$ off-gas feed stream 12 is contacted with the redox catalyst in reactor 14 for a time sufficient to remove the saturated hydrocarbons, unsaturated hydrocarbons, and chlorinated hydrocarbons from the $CO_2$ feed such that they are present in an amount of less than 0.01 ppmv based on the total volume of the $CO_2$ stream. The catalyst can be used on stream, before regenerating, for greater than or equal to 500 hours (hrs), preferably, 500 to 1000 hrs. The contact time between the $CO_2$ off-gas stream 12 and the redox catalyst can be less than or equal to one minute, preferably, less than or equal to 30 seconds (sec), more preferably, less than or equal to 10 seconds, and still more preferably, 1 to 3 seconds, or 2.4 to 3 seconds.

During processing, purification reactions occur for the chlorinated hydrocarbons. More preferably, chlorinated hydrocarbons in $CO_2$ off-gas stream 12 can react to form the corresponding saturated hydrocarbon and HCl. The HCl can then react with oxygen in the catalyst to form the metal chloride of the metal(s) in the catalyst and $H_2O$. For purposes of illustration, using manganese oxide catalyst as the redox catalyst and the impurity ethyl chloride ($C_2H_5Cl$), the following reactions 1-3 could occur:

$$C_2H_5Cl \rightarrow C_2H_4 + HCl \qquad 1$$

$$C_2H_4 + 6MnO_2 \rightarrow 2CO_2 + 2H_2O + 6MnO \qquad 2$$

$$MnO + 2HCl \rightarrow MnCl_2 + H_2O \qquad 3$$

Reactions similar to reactions 1-3 can also occur in reactor 14 for other chlorinated hydrocarbons present in $CO_2$ off-gas stream 12 to produce further $CO_2$, $H_2O$, and $MnCl_2$. After processing is initiated, reactions 1-3 can occur simultaneously. It is noted that in addition to reactions 1-3 occurring during purification, further reactions to convert various other saturated hydrocarbons and unsaturated hydrocarbons that may or may not be chlorinated to $CO_2$ and $H_2O$ can occur.

After contacting $CO_2$ off-gas stream 12 with the redox catalyst for a time sufficient to remove all or substantially all (i.e. such that the level of impurities is less than or equal to 0.01 ppmv based on the total volume of the $CO_2$ stream) of the saturated hydrocarbons, unsaturated hydrocarbons, and/or chlorinated hydrocarbons from the $CO_2$ off-gas stream, purified $CO_2$ and $H_2O$ are removed from reactor 14 as product stream 18. Product stream 18 can be sent to dewatering unit 22 for removal of water via stream 24 and purified product $CO_2$ stream 26 can be used in applications such as food grade products and methanol synthesis. The dewatering unit 22 can be, for example, a unit where the gas stream is passed through, for example caustic or calcium chloride or a silica gel, which then could be regenerated by drying.

As discussed above, purification can occur without an additional source of oxygen being added to the $CO_2$ off-gas feed stream. During purification, oxygen in the redox catalyst is consumed such that oxygen in the catalyst becomes depleted. Once the oxygen depletion reached a certain point, e.g., when greater than or equal to 90%, preferably, greater than or equal to 99%, more preferably, 100% of the metal oxide has been converted to metal chloride regeneration of the catalyst can occur (e.g., with an oxygen source such as air or an oxygen stream) to transform the $MeCl_2$ back to molecular chloride and restore oxygen in the catalyst.

More preferably, regeneration of the oxygen in the catalyst can occur by the addition of oxygen (e.g., in stream 16) fed to reactor 14. During regeneration, flow of the $CO_2$ off-gas feed stream 12 to reactor 14 is ceased. Regeneration can be carried out in a reactor for a time sufficient to restore the oxygen content on the catalyst to a level that is sufficient to process further $CO_2$ and provide an amount of oxygen for stoichiometric oxidation of the impurities. Likewise, the depleted catalyst can be removed from the reactor or from the reaction zone and regenerated in either a separate reactor and/or reaction zone. Depleted catalyst can be continuously replaced with fresh/regenerated catalyst and can be continuously added such that $CO_2$ purification does not have to be stopped during the catalyst regeneration.

The oxygen can be restored such that greater than or equal to 90%, preferably, greater than or equal to 99%, more preferably, 100% of the metal chloride is converted back to its metal oxide form. Catalyst regeneration can take 1 to 60 hrs, preferably, 10 to 24 hrs.

Using Mn as the metal in the catalyst for purposes of illustration, the regeneration reaction 4 is exemplified as follows:

$$MnCl_2 + O_2 \rightarrow MnO_2 + Cl_2 \qquad 4$$

The resultant chlorine ($Cl_2$) can be removed from reactor 14 via stream 20.

Figure 2:
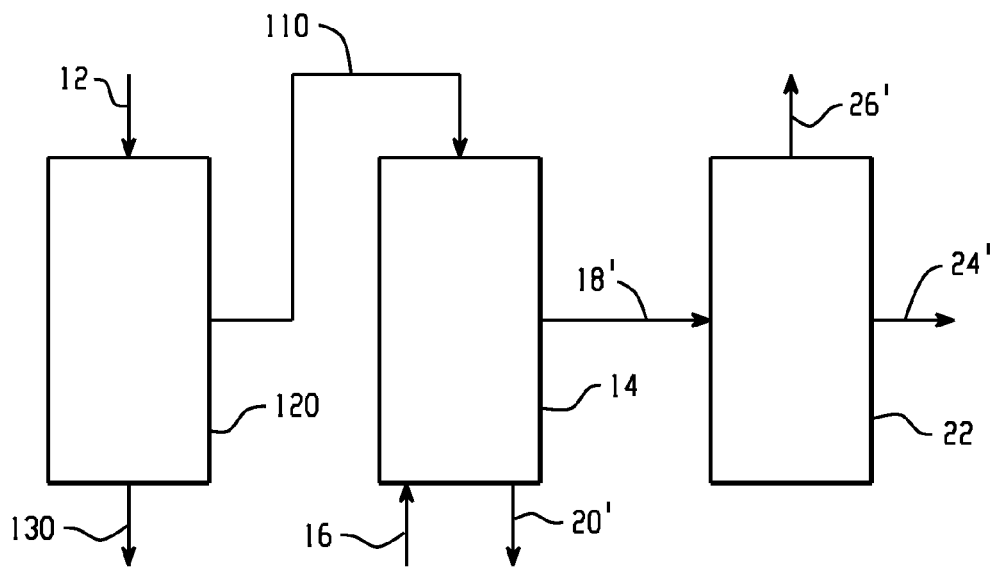
FIG. 2 illustrates a system and process for purification of a $CO_2$ off-gas stream.

As illustrated in FIG. 2, a dewatering unit can optionally be used upstream of the reactor 14. In particular, FIG. 2 shows a system 100 for the purification of $CO_2$ off-gas stream 12. As shown in FIG. 2, $CO_2$ off-gas feed stream 12 is fed to dewatering unit 120. Water in $CO_2$ off-gas stream 12 is removed in unit 120, for example, using an absorbent such as caustic, calcium chloride, or a silica gel such that water can be removed via stream 130. Dewatered $CO_2$ off-gas feed stream 110 that can comprise less than or equal to 0.01 ppmv of water is then fed to reactor 14 for purification of $CO_2$ as discussed hereinabove with regard to reactor 14. $CO_2$ and $H_2O$ are removed from unit 14 via product stream 18 and fed to dewatering unit 22. Dewatering unit 22 separates $H_2O$ via stream 24 and product $CO_2$ stream 26.

As detailed above, it is expected that purification of $CO_2$ in accordance with the present system and method provides a practical solution for the purification of $CO_2$, and more preferably to the purification of $CO_2$ off-gas streams from ethylene glycol plants. Oxygen in the redox catalyst allows purification to occur of pure $CO_2$ off-gas without the need for an additional source of oxygen fed to the reactor during the purification phase. This further allows the elimination of the addition of hydrogen to remove excess oxygen from the $CO_2$. It is believed that the stoichiometric oxidation of the impurities by catalyst oxygen allows purification of $CO_2$ due to the very low ratio of the amount of impurities to the oxygen capacity of the catalyst.

The following examples are provided to illustrate certain aspects of the purification of $CO_2$ in accordance with the present invention. The examples are merely illustrative and are not intended to limit the systems and methods in accordance with the disclosure of the materials, conditions, or process parameters set forth therein.

EXAMPLES

To understand the maximum absorption capacity of a redox catalyst, purification of $CO_2$ at concentrations exceeding 10 times that of typical or actual concentrations of certain impurities (except for ethyl chloride which was analyzed at about that of a typical impurity level were investigated. The catalyst used in Examples 1-3 was a mixture of manganese and lanthanum oxides (Mn—La—O). Accordingly, the maximum absorption capacity of a redox catalyst using Mn—La—O was analyzed using the level of impurities set forth in Table 2.

TABLE 2

| | |
|---|---|
| Ethylene dichloride | 0.097 ppmv |
| Allyl chloride | 1.01 ppmv |
| Ethyl chloride | 2.51 ppmv |
| Methyl chloride | 1.01 ppmv |
| Vinyl chloride | 1.02 ppmv |

The following examples are described in the results of the catalyst performance. These examples are exemplary, not limiting.

Example 1: Carbon Dioxide Purification

A $CO_2$ off-gas stream containing about 10 times the expected level of chlorinated hydrocarbons, (except that the level of ethyl chloride impurities was standard), was fed to a reactor containing 1.5 g of a Mn—La—O mixed metal redox catalyst. The temperature in the reactor was at 450° C., and the pressure was atmospheric. The $CO_2$ off-gas stream was contacted with the catalyst. The flow rate of the $CO_2$ off-gas stream was 50 cubic centimeters per minute (cc/min). At this flow rate, after interaction of the $CO_2$ off-gas stream with the catalyst, all of the chlorinated impurities were removed. Testing of the product stream in the gas chromatograph (GC) after two weeks of purification showed that the product stream was still free of chlorinated contaminants. It is believed that the organic chlorides at these conditions decomposed to organic compounds (such as olefin and acetylene) and HCl; the organic compounds were transformed to $CO_2$ and $H_2O$; and the HCl reacted with the catalyst and transformed to manganese chloride and lanthanum chloride.

Example 2: Catalyst Regeneration

Figure 3:
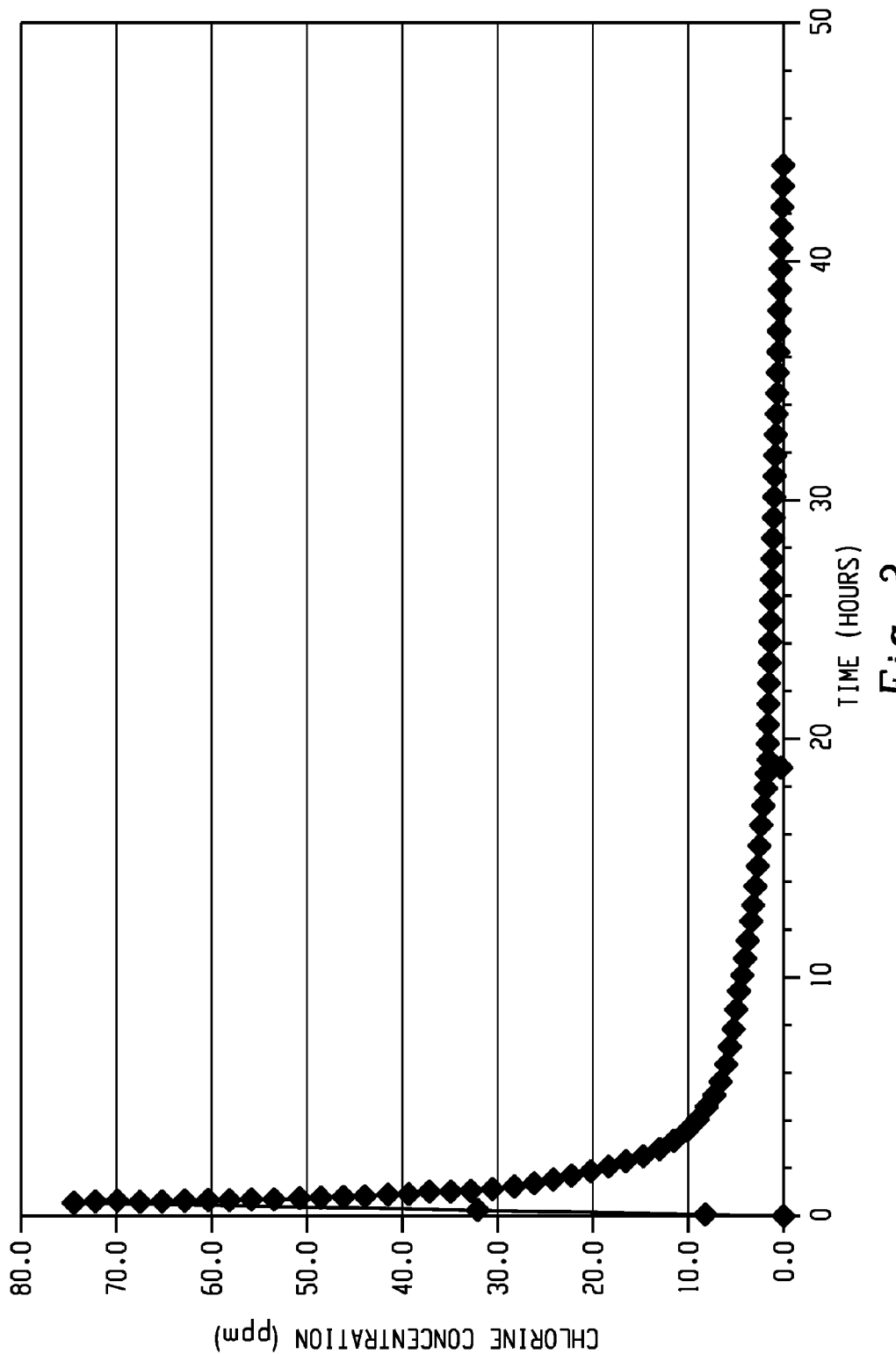
FIG. 3 is a graphical illustration of the concentration of chlorine in outlet air of Example 2.

The conditions of the experiment in Example 2 are the same as in Example 1, except that the $CO_2$ off-gas feed stream was not flowing and air was fed to the reactor for regeneration of the oxygen in the catalyst. The catalyst was treated with air and the outlet gas was analyzed. The experiment proved formation of molecular chloride during treatment of the catalyst by air (reaction 4 above). This establishes that metal chloride is formed during decomposition of organic chloride (reactions 1-3). The dynamics of formation of molecular chloride and regeneration of the catalyst by reaction (4) are shown in FIG. 3, where FIG. 3 shows the concentration of chlorine in outlet air used for regeneration. As can be seen, the catalyst was fully regenerated in under 40 hours and substantially regenerated, i.e. the outlet stream comprised less than or equal to 0.01 ppmv of chlorine, in 20 hours.

Example 3: Carbon Dioxide Purification at a Decreased Flow Rate

The experiments in Example 3 were performed as in the case of Example 1, except the flow rate of the $CO_2$ off-gas stream was 25 cc/min. When flow rate was decreased from 50 to 25 cc/min, the appearance of non-reacted organic chlorides in the outlet $CO_2$ after three months was not observed.

Example 4: Carbon Dioxide Purification at an Increased Flow Rate

The experiments in Example 4 were performed as in the case of Example 1, except the flow rate of the $CO_2$ off-gas stream was 150 cc/min. When flow rate was increased from 50 to 150 cc/min non-reacted organic chlorides were observed in the outlet $CO_2$. Table 3 shows the consumption of vinyl chloride with time, where the initial concentration of the vinyl chloride in $CO_2$ was 1.02 ppmv and Table 4 shows the consumption of methyl chloride with time, where the initial concentration of the methyl chloride in $CO_2$ was 1.01 ppmv. TOS stands for time on stream.

TABLE 3

| TOS (hours) | Concentration (ppmv) | Consumption (vol %) |
|---|---|---|
| 0.30 | 0.38 | 76.8 |
| 0.67 | 0.53 | 67.9 |
| 4.48 | 0.63 | 62.3 |
| 7.86 | 0.68 | 59.3 |
| 14.75 | 0.74 | 55.5 |
| 20.97 | 0.77 | 53.6 |
| 29.58 | 0.82 | 50.6 |
| 33.80 | 0.86 | 48.5 |
| 44.50 | 0.90 | 46.3 |

TABLE 4

| TOS (hours) | Concentration (ppmv) | Consumption (vol %) |
|---|---|---|
| 20 | 0 | 100 |
| 40 | 0 | 100 |
| 60 | 0 | 100 |
| 70 | 0 | 100 |
| 80 | 0.075 | 91.8 |
| 104 | 0.118 | 88.3 |
| 128 | 0.146 | 85.5 |
| 152 | 0.157 | 84.4 |
| 176 | 0.169 | 83.3 |
| 200 | 0.182 | 81.9 |

Tables 3 and 4 illustrate that chlorides have different reactivity, where methyl chloride is more active than vinyl chloride and that non-reacted methyl chloride in gas chromatography analysis appears later than vinyl chloride. Without being bound by theory, it is believed that allyl chloride decomposition is easier than vinyl chloride that is why allyl chloride does not appear. Other chlorides also are reactive therefore did not appear in the outlet $CO_2$ during these experiments.

Set forth below are some embodiments of the present process for purifying $CO_2$.

Embodiment 1

A process for the purification of $CO_2$ from chlorinated hydrocarbons and non-chlorinated hydrocarbons, comprising: contacting a $CO_2$ stream with a metal oxide catalyst, wherein the stream comprises the $CO_2$, and impurities, wherein the impurities comprise the non-chlorinated hydrocarbons and the chlorinated hydrocarbons; interacting the impurities with the metal oxide catalyst to form additional $CO_2$ and metal chloride; and regenerating the metal oxide catalyst by contacting the metal chloride with an oxygen containing gas stream.

Embodiment 2

The process of Embodiment 1, wherein the regenerating produces molecular chlorine and wherein the process further comprises absorbing the molecular chlorine with water.

Embodiment 3

The process of any of Embodiments 1-2, wherein the regenerating is performed for a time of less than or equal to 60 hours.

Embodiment 4

The process of any of Embodiments 1-3, wherein no oxygen is added to the $CO_2$ stream before or during the contacting and the interacting.

Embodiment 5

The process of any of Embodiments 1-4, wherein the $CO_2$ stream comprises less than or equal to 0.3 ppmv, preferably, less than or equal to 0.001 ppmv of oxygen.

Embodiment 6

A process for the purification of $CO_2$ from chlorinated hydrocarbons and non-chlorinated hydrocarbons, comprising: contacting a $CO_2$ stream with a metal oxide catalyst, wherein the $CO_2$ stream comprises the $CO_2$ and impurities, wherein the impurities comprise the non-chlorinated hydrocarbons and the chlorinated hydrocarbons; oxidizing the impurities with catalyst oxygen to form additional $CO_2$ and converting the chlorine to metal chloride; and regenerating the metal oxide catalyst by contacting the metal chloride with an oxygen containing gas stream. No oxygen is added to the $CO_2$ stream before or during the contacting and the oxidation.

Embodiment 7

The process of Embodiment 6, wherein the $CO_2$ stream comprises less than or equal to 0.3 ppmv, preferably, less than or equal to 0.001 ppmv of oxygen.

Embodiment 8

A process for the purification of $CO_2$ from chlorinated hydrocarbons and non-chlorinated hydrocarbons, comprising: contacting a $CO_2$ stream with a metal oxide catalyst, wherein the $CO_2$ stream comprises the $CO_2$ and impurities, wherein the impurities comprise the non-chlorinated hydrocarbons and the chlorinated hydrocarbons; oxidizing the impurities with catalyst oxygen to form additional $CO_2$ converting the chlorine to metal chloride; and regenerating the metal oxide catalyst by contacting the metal chloride with an oxygen containing gas stream. The $CO_2$ stream comprises less than or equal to 0.3 ppmv of oxygen.

Embodiment 9

The process of Embodiment 8, wherein no oxygen is added to the $CO_2$ stream before or during the contacting and the oxidation.

Embodiment 10

The process of Embodiments 6-9, further comprising regenerating the metal oxide catalyst by contacting the metal chloride with an oxygen containing gas stream.

Embodiment 11

The process of Embodiment 10, wherein the regenerating produces molecular chlorine and wherein the process further comprises absorbing the molecular chlorine with water.

Embodiment 12

The process of any of Embodiments 10-11, wherein the regenerating is performed for a time of less than or equal to 60 hours.

Embodiment 13

The process of any of Embodiments 1-12, wherein the contacting is performed at a temperature of 400 to 500° C.

Embodiment 14

The process of any of Embodiments 1-13, wherein the contacting is at a temperature of 440 to 460° C.

Embodiment 15

The process of any of Embodiments 1-14, wherein the contact time of the $CO_2$ stream with the catalyst is 2.4 to 3 sec.

Embodiment 16

The process of any of Embodiments 1-15, wherein all of the non-chlorinated hydrocarbons and chlorinated hydrocarbons are converted to $CO_2$ and water.

Embodiment 17

The process of any of Embodiments 1-16, wherein the contacting is performed for a time of greater than or equal to 500 hours.

Embodiment 18

The process of any of Embodiments 1-17, wherein the contacting is performed for a time of greater than or equal to 500 hours.

Embodiment 19

The process of any of Embodiments 1-18, wherein the contacting is performed under conditions that oxygen is not added to the $CO_2$ stream and the $CO_2$ stream was not an oxygen diluted $CO_2$ stream.

Embodiment 20

The process of any of Embodiments 1-19, wherein the metal comprises Mn, Sn, W, V, Mo, La, Ce, Pb, Mg, or a combination comprising one or more of the foregoing.

Embodiment 21

The process of any of Embodiments 1-20, wherein the metal comprises at least one first metal selected from the group of Mn, Sn, W, V, and Mo and at least one second metal selected from the group consisting of La, Ce, Pb, and Mg.

Embodiment 22

The process of Embodiment 21, wherein the first metal comprises Mn and the second metal comprises La.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt %, or, more preferably, 5 to 20 wt %", is inclusive of the endpoints and all intermediate values of the ranges of "5 to 25 wt %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. This application claims priority to U.S. Patent Application 61/891,448 both filed Oct. 16, 2013, which are incorporated herein by reference in their entirety.

While particular embodiments have been described, alternatives, modifications, variations, improvements, and substantial equivalents that are or may be presently unforeseen may arise to Applicants or others skilled in the art. Accordingly, the appended claims as filed and as they may be amended are intended to embrace all such alternatives, modifications variations, improvements, and substantial equivalents.

Disclosure of a narrower range or more specific group in addition to a broader range is not a disclaimer of the broader range or larger group.

We claim:

1. A process for the purification of $CO_2$ from chlorinated hydrocarbons and non-chlorinated hydrocarbons, comprising:
    contacting a $CO_2$ off-gas stream from an ethylene glycol plant with a metal oxide catalyst, wherein the $CO_2$ off-gas stream comprises the $CO_2$ and impurities, wherein the impurities comprise the non-chlorinated hydrocarbons and the chlorinated hydrocarbons;
    oxidizing the impurities with catalyst oxygen to form additional $CO_2$ and converting the chlorine to metal chloride; and
    regenerating the metal oxide catalyst by contacting the metal chloride with an oxygen containing gas stream;
    wherein no oxygen is added to the $CO_2$ off-gas stream before the contacting;
    wherein no oxygen is added to the $CO_2$ off-gas stream before the oxidizing;
    wherein no oxygen is added to the $CO_2$ off-gas stream during the contacting; and
    wherein no oxygen is added to the $CO_2$ off-gas stream during the oxidizing.

2. The process of claim 1, further comprising regenerating the metal oxide catalyst by contacting the metal chloride with an oxygen containing gas stream.

3. The process of claim 2, wherein the regenerating produces molecular chlorine and wherein the process further comprises absorbing the molecular chlorine with water.

4. The process of claim 2, wherein the regenerating is performed for a time of less than or equal to 60 hours.

5. The process of claim 1, wherein the metal comprises a first metal selected from the group of Mn, Sn, W, V, and Mo and a second metal selected from the group consisting of La, Ce, Pb, and Mg.

6. The process of claim 1, wherein the $CO_2$ off-gas stream consists essentially of the $CO_2$ and impurities and wherein the impurities are present in the $CO_2$ off-gas stream in an amount of 2 to 5 ppmv of impurities based on the total volume of $CO_2$ off-gas stream.

7. A process for the purification of $CO_2$ from chlorinated hydrocarbons and non-chlorinated hydrocarbons, comprising:
    contacting a $CO_2$ stream with a metal oxide catalyst, wherein the $CO_2$ stream comprises the $CO_2$ and impurities, wherein the impurities comprise the non-chlorinated hydrocarbons and the chlorinated hydrocarbons, wherein the impurities comprise oxygen and wherein the oxygen is present in an amount of less than or equal to 0.3 ppmv based on the total volume of the $CO_2$ stream;
    oxidizing the impurities with catalyst oxygen to form additional $CO_2$ and converting the chlorine to metal chloride; and
    regenerating the metal oxide catalyst by contacting the metal chloride with an oxygen containing gas stream;
    wherein no oxygen is added to the $CO_2$ off-gas stream before the contacting;
    wherein no oxygen is added to the $CO_2$ off-gas stream before the oxidizing;
    wherein no oxygen is added to the $CO_2$ off-gas stream during the contacting; and
    wherein no oxygen is added to the $CO_2$ off-gas stream during the oxidizing.

8. The process of claim 7, wherein the regenerating produces molecular chlorine and wherein the process further comprises absorbing the molecular chlorine with water.

9. The process of claim 7, wherein the regenerating is performed for a time of less than or equal to 60 hours.

10. The process of claim 7, wherein the contacting is performed at a temperature of 400 to 500° C.

11. The process of claim 7, wherein the contacting is at a temperature of 440 to 460° C.

12. The process of claim 7, wherein the contact time of the $CO_2$ stream with the catalyst is 2.4 to 3 sec.

13. The process of claim 7, wherein all of the non-chlorinated hydrocarbons, and chlorinated hydrocarbons are converted to $CO_2$ and water.

14. The process of claim 7, wherein the contacting is performed for greater than or equal to 500 hours.

15. The process of claim 7, wherein the metal comprises Mn, Sn, W, V, Mo, La, Ce, Pb, Mg, or a combination comprising one or more of the foregoing.

16. The process of claim 7, wherein the metal comprises a first metal selected from the group of Mn, Sn, W, V, and Mo and a second metal selected from the group consisting of La, Ce, Pb, and Mg.

17. The process of claim 7, wherein the metal comprises Mn and La.

18. The process of claim 7, further comprising regenerating the metal oxide catalyst by contacting the metal chloride with an oxygen containing gas stream.

19. The process of claim 7, wherein the $CO_2$ stream is a $CO_2$ off-gas stream from an ethylene glycol plant.

20. A process for the purification of $CO_2$ from chlorinated hydrocarbons and non-chlorinated hydrocarbons, comprising:

adding a $CO_2$ stream to a reactor comprising a metal oxide catalyst; wherein the $CO_2$ stream comprises the $CO_2$ and impurities, wherein the impurities comprise the non-chlorinated hydrocarbons and the chlorinated hydrocarbons, wherein the impurities comprise oxygen and wherein the oxygen is present in an amount of less than or equal to 0.3 ppmv based on the total volume of the $CO_2$ stream;

in the reactor, simultaneously oxidizing the impurities with catalyst oxygen to form additional $CO_2$ and converting the chlorine to metal chloride; and after the oxidizing and the converting, regenerating the metal oxide catalyst by first ceasing the adding of the $CO_2$ stream to the reactor, and only after the ceasing of the $CO_2$ stream to a reactor, contacting the metal chloride with an oxygen containing gas stream by adding the oxygen containing gas stream to the reactor;

wherein a stream comprising molecular oxygen other than the $CO_2$ stream is not added to the reactor before the adding;

wherein a stream comprising molecular oxygen other than the $CO_2$ stream is not added to the reactor before the oxidizing;

wherein a stream comprising molecular oxygen other than the $CO_2$ stream is not added to the reactor during the adding; and wherein a stream comprising molecular oxygen other than the $CO_2$ stream is not added to the reactor during the oxidizing.

* * * * *